No. 798,557. PATENTED AUG. 29, 1905.
V. ANGERER.
RAILWAY SWITCH.
APPLICATION FILED JUNE 8, 1905.
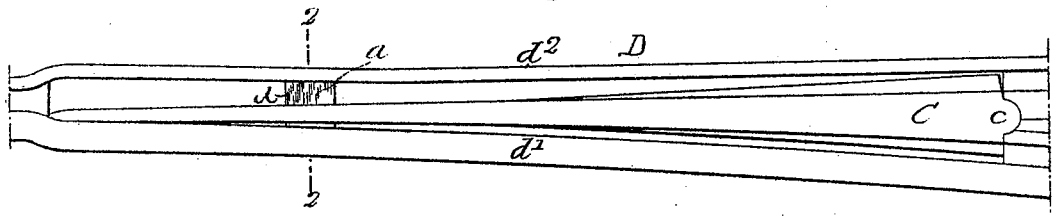
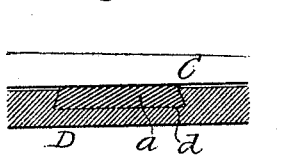
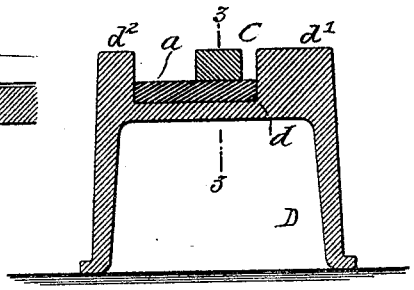
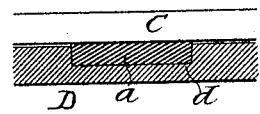
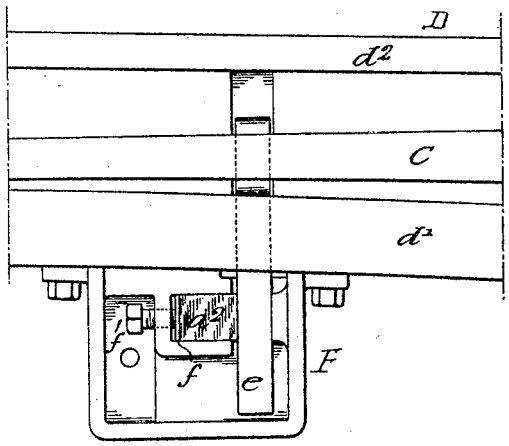
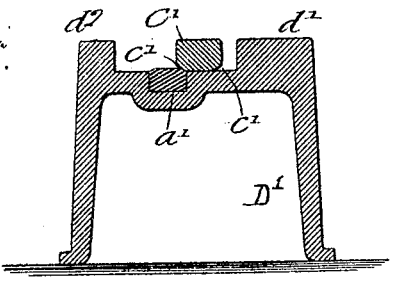

UNITED STATES PATENT OFFICE.

VICTOR ANGERER, OF RIDLEY PARK, PENNSYLVANIA, ASSIGNOR TO WILLIAM WHARTON, JR., & COMPANY, INCORPORATED, OF PHILADELPHIA, PENNSYLVANIA, A CORPORATION OF PENNSYLVANIA.

RAILWAY-SWITCH.

No. 798,557.     Specification of Letters Patent.     Patented Aug. 29, 1905.

Application filed June 8, 1905. Serial No. 264,308.

*To all whom it may concern:*

Be it known that I, VICTOR ANGERER, a citizen of the United States, residing at Ridley Park, Pennsylvania, have invented certain Improvements in Railway-Switches, of which the following is a specification.

My invention relates to switches used in street-railway and suburban roads for trolleys and other light cars. Switches of this type must be so constructed that they can be shifted by the operator of the car; but the great objection to this type of switch is that in some instances the wheels in passing over the switch will accidentally shift the tongue, causing in some cases serious accidents.

The object of my invention is to prevent the accidental shifting of the tongue while the car is passing over the switch structure. This object I attain in the following manner, reference being had to the accompanying drawings, in which—

Figure 1 is a plan view of a pivoted-tongue switch, illustrating my invention. Fig. 2 is a transverse sectional view on the line 2 2, Fig. 1. Fig. 3 is a sectional view on the line 3 3, Fig. 2. Figs. 4, 5, 6 are views illustrating modifications of my invention.

D is the body of the switch structure. C is the tongue, pivoted at $c$ in the present instance. The body portion is recessed at $d$, and mounted in the recess is a block $a$, of rubber or other suitable friction material. This block, as clearly illustrated in Fig. 3, is mounted so that its upper surface is above the surface of the base of the groove in the switch structure, so that the switch-tongue C will rest directly on the block, and when the car-wheels pass over the tongue the tongue will be embedded in the block, thus preventing it moving accidentally while there is any weight upon it. When the tongue is relieved of weight, there is simply sufficient friction to prevent the shifting of the tongue without lateral pressure by means of a shifting-bar or other device in the hands of the operator. The friction material may be of any width desired, according to the amount of friction necessary to hold the tongue in its adjusted position, and in some instances this friction material may be held by dovetailing or undercutting, as illustrated in Fig. 4.

In Fig. 5 I have shown a modification in which the friction material $a'$ is set in a recess in the switch structure $D'$ and does not extend the full width of the space between the tread-surface $d'$ and guard $d^2$, and each side of the friction-block is beveled to correspond with the beveled edges $c'$ of the switch-tongue $C'$. Thus when the tongue is in one position or the other it is held from lateral movement by the projecting portion of the friction-block; but it can be readily shifted by the operator using a bar, so as to carry the tongue over the friction-surface.

In Fig. 6 I have shown the tongue C provided with a laterally-extending bar $e$, attached or made integral with the tongue. This bar projects into a box F, secured to one side of the structure, and mounted in the pocket $f$ in the box is a friction-block $a^2$, which can be set up by a set-screw $f'$. This block bears against the bar $e$, and the friction between the block and the bar is sufficient to retain the tongue in its adjusted position. The block is preferably made of rubber or other yielding material.

I claim as my invention—

1. The combination of the body portion of a switch structure, a pivoted tongue, with a block of friction material acting to prevent the accidental displacement of the tongue, substantially as described.

2. The combination of the body portion of a switch structure, a pivoted tongue, a block of friction material mounted in the body of the switch and extending above the level of the groove in the said structure and upon which the tongue rests, substantially as described.

3. The combination of a body portion of a switch structure having a longitudinal groove therein, a pivoted tongue mounted in said groove, a recess in the switch structure extending under the tongue, a block of rubber mounted in the recess, the upper surface of the said block extending above the base of the groove so that the switch-tongue will rest on the rubber block, but when the cars are passing over the structure the tongue will have a bearing upon the body of the structure, substantially as described.

In testimony whereof I have signed my name to this specification in the presence of two subscribing witnesses.

VICTOR ANGERER.

Witnesses:
   WILL. A. BARR,
   JOS. H. KLEIN.